In some examples, a telecommunications-network packet

(12) United States Patent
Mendoza et al.

(10) Patent No.: US 10,749,837 B2
(45) Date of Patent: Aug. 18, 2020

(54) NETWORK ACCESS CONTROL BASED ON PROFILE TYPE

(71) Applicant: T-Mobile USA, Inc., Bellevue, WA (US)

(72) Inventors: Salvador Mendoza, Issaquah, WA (US); Suliman Albasheir, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 125 days.

(21) Appl. No.: 16/193,375

(22) Filed: Nov. 16, 2018

(65) Prior Publication Data

US 2020/0162382 A1 May 21, 2020

(51) Int. Cl.
*H04L 29/12* (2006.01)
*H04L 12/24* (2006.01)
*H04L 29/06* (2006.01)
*H04L 12/741* (2013.01)
*H04L 12/46* (2006.01)
*H04L 12/66* (2006.01)
*H04L 12/721* (2013.01)

(52) U.S. Cl.
CPC .......... *H04L 61/15* (2013.01); *H04L 41/0893* (2013.01); *H04L 45/745* (2013.01); *H04L 63/101* (2013.01); *H04L 63/102* (2013.01); *H04L 12/4633* (2013.01); *H04L 12/66* (2013.01); *H04L 45/12* (2013.01)

(58) Field of Classification Search
CPC . H04L 61/15–1594; H04L 61/25–2596; H04L 45/12; H04L 45/74; H04L 45/741; H04L 45/745; H04L 41/0893; H04L 12/4633; H04L 12/66
See application file for complete search history.

(56) References Cited

U.S. PATENT DOCUMENTS

| 7,636,790 B1 * | 12/2009 | Parker | H04L 29/12047 |
| | | | 709/238 |
| 2018/0255092 A1 * | 9/2018 | Thubert | H04L 61/1511 |

(Continued)

OTHER PUBLICATIONS

"Protocol Configuration Options", LTE Quick Reference, Share Technote, published Jan. 23, 2018, 5 pages.

(Continued)

*Primary Examiner* — Joshua Kading
(74) *Attorney, Agent, or Firm* — Lee & Hayes, P.C.

(57) ABSTRACT

In some examples, a telecommunications-network packet gateway can receive, from a terminal via a packet tunnel, a lookup request for a network address associated with a server name. The packet gateway can determine a profile identifier associated with the packet tunnel and retrieve, from a policy server, an associated profile type. The packet gateway can then select a nameserver associated with the profile type, and forward the lookup request to the nameserver. The nameserver can store a name list. Upon receiving a request, the nameserver can determine whether the server name is included in the name list and, in response, send a reply. In some examples, the packet gateway receives a request from the terminal for content, determines a profile type, selects a destination server associated with the profile type, and forwards the request to the destination server.

20 Claims, 10 Drawing Sheets

(56) References Cited

U.S. PATENT DOCUMENTS

2018/0375953 A1* 12/2018 Casassa Mont .... H04L 61/6022
2019/0215331 A1* 7/2019 Anakata .................. H04L 67/10

OTHER PUBLICATIONS

Mockapetris P., "Domain Names—Concepts and Facilities", Request for Comments 1034, Network Working Group, Nov. 1987, pp. 1-7, 18-23, 28-36.

"Server Name Indication", Wikipedia, retrieved Aug. 4, 2018 from <<https://en.wikipedia.org/w/index.php?title=Server_Name_Indication&oldid=851302758>>, 5 pages.

* cited by examiner

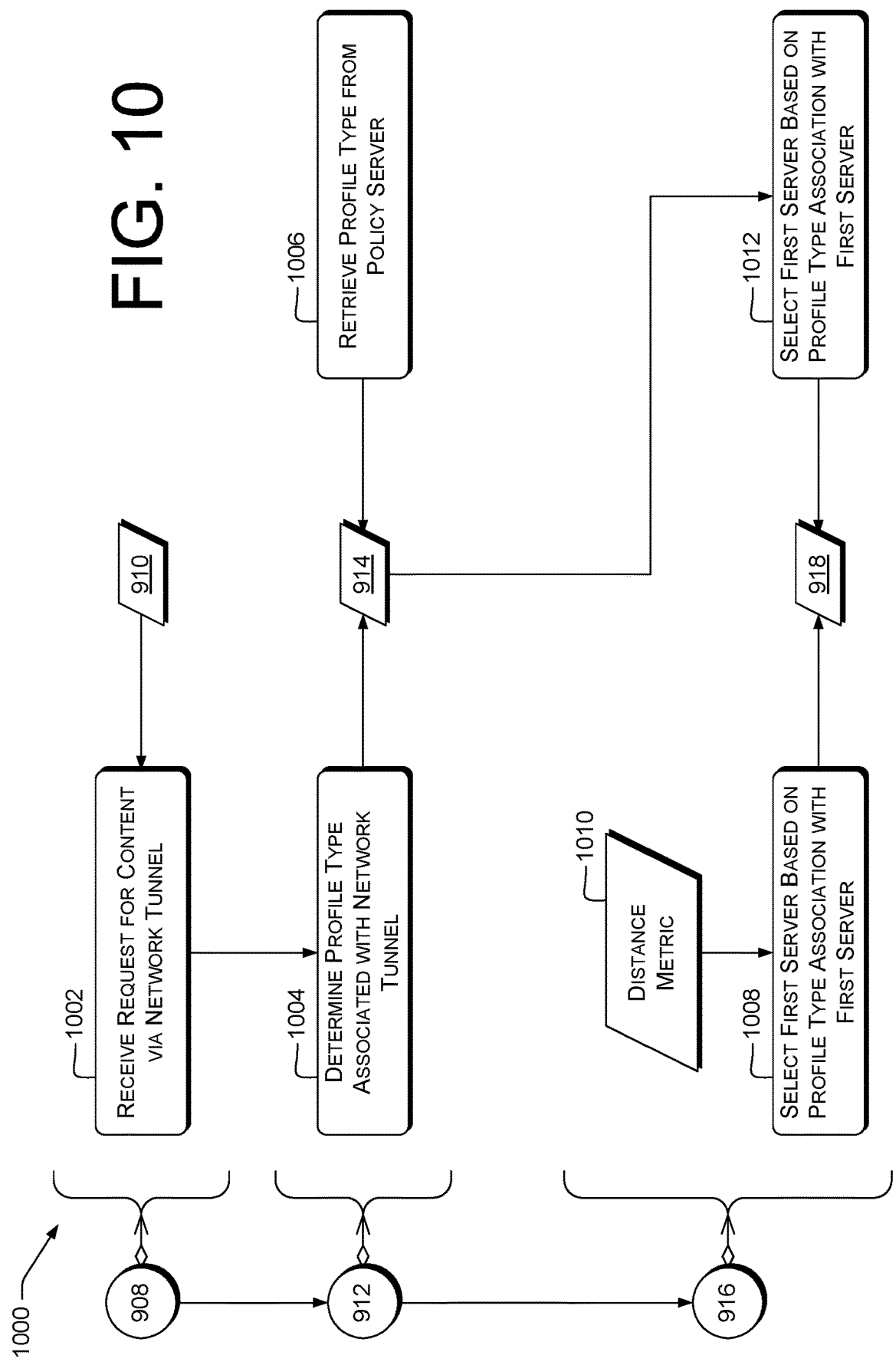

NETWORK ACCESS CONTROL BASED ON PROFILE TYPE

CROSS-REFERENCE TO RELATED APPLICATIONS

Not applicable.

BACKGROUND

Modern telecommunications networks such as cellular telephone networks can support a variety of types of session, such as voice, video, or messaging. Fourth-generation (4G) cellular networks such as Long Term Evolution (LTE) networks and fifth-generation (5G) cellular networks such as the Third-Generation Partnership Project (3GPP) 5G System generally carry streaming media or other traffic, e.g., Internet traffic, over packet-switched (PS) connections. Such packet-switched connections can provide greater speed and throughput than do CS connections, and can make packet-switched data from other networks, such as the Internet, more readily available.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. For brevity of illustration, in the diagrams herein, an arrow beginning with a diamond connects a first component or operation (at the diamond end) to at least one second component or operation that is or can be, in at least one example, included in the first component or operation.

FIG. 10 illustrates example access-control processes performed in a telecommunications network, e.g., at a packet gateway thereof.

DETAILED DESCRIPTION

Overview

Figure 1:
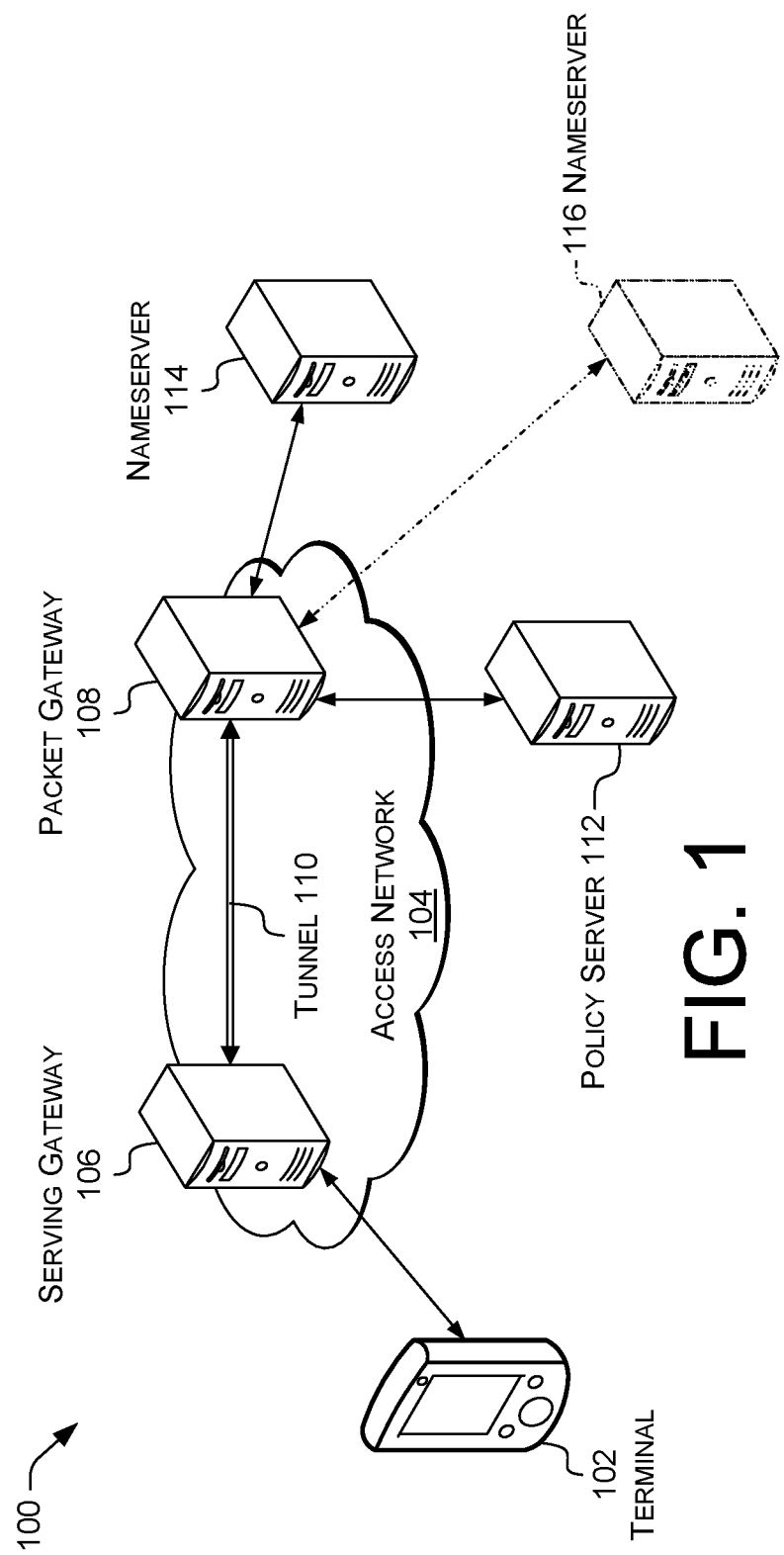
FIG. 1 illustrates an overview of nodes and devices involved in control of access to network services.

This disclosure describes, in part, a packet gateway configured to implement access control of the network services accessible to a terminal. Example packet gateways can include a General Packet Radio Service (GPRS) Gateway Support Nodes (GGSN), an LTE Packet Data Network Gateways (PDN-GW or PGW), or a 5G User Plane Function (UPF). Packet gateways convey traffic between a tunnel connected to a terminal and an external network. For Internet Protocol (IP)-based traffic, User Datagram Protocol (UDP) or Transmission Control Protocol (TCP) well-known port numbers identify the network service associated with a particular packet.

In some examples, a packet gateway inspects traffic from a terminal on UDP or TCP port 53, the well-known port for Domain Name System (DNS) requests. Such traffic is typically addressed to a "nameserver," a server that maps human-readable names to network addresses. Various examples herein use UDP and DNS for brevity; however, techniques herein can be used for other types of name lookup, e.g., X.509 or Lightweight Directory Access Protocol (LDAP). The terminal is associated with a particular subscriber. Depending on a profile type associated with the subscriber, the packet gateway forwards a DNS request or other name-lookup request to a nameserver associated with that profile type. The nameserver receiving the lookup request can then process the lookup request according to the profile type without needing to access user-specific data. This can improve lookup performance, since the nameserver does not have to query a policy server. This can also improve user privacy, since (in some examples) the nameserver does not receive any identifying information of the terminal or the subscriber in association with the lookup request.

As used herein, a "terminal" is a communication device, e.g., a cellular telephone or other user equipment (UE), configured to perform, or intercommunicate with systems configured to perform, techniques described herein. Terminals can include, e.g., wireless or wired voice- or data-communication devices. A terminal can include a user interface (e.g., as does a smartphone), but is not required to. For example, a streaming server configured to provide audio or visual content on demand can be a terminal. Such a terminal may not include a user interface, and may instead respond to other terminals that form queries and send those queries to the server in response to actions taken via interfaces at those other terminals. A terminal can be, e.g., a cellular phone, smartphone, tablet computer, personal digital assistant (PDA), personal computer (PC), laptop computer, media center, work station, etc.

The terms "session" and "communication session" as used herein includes a communications path for bidirectional exchange of data among two or more terminals. Example sessions include voice and video calls, e.g., by which human beings converse, a data communication session, e.g., between two electronic systems or between an electronic system and a human being, or a Rich Communication Suite (RCS, also known as JOYN) session. Sessions can be carried, e.g., by cellular or data networks, e.g., LTE or Institute of Electrical and Electronics Engineers (IEEE) 802.11 (WIFI). Other examples of networks are discussed below.

Subsection headers in this Detailed Description are solely for convenience in reading. No limitations are implied by the presence or arrangement of the subsection headers, or by the separation of features between those subsections. Some examples include features from only one subsection. Some examples include features from more than one subsection.

As used herein, the term "unique identifier" and similar terms encompass both truly unique identifiers (e.g., Ethernet MAC addresses that are unique by construction, or Version 1 UUIDs) and identifiers with a negligible probability of collision (non-uniqueness) (e.g., SHA256 hashes of data uniquely identifying an object, or Version 4 UUIDs).

As used herein, a "random" value can be a truly random value, e.g., measured from physical phenomena, or a pseudorandom value. Examples of random values include cryptographically-strong random numbers.

Illustrative Telecommunications Network and Components

FIG. 1 illustrates an example telecommunications network 100 and shows an overview of nodes and devices involved in control of access by terminals to network services. The illustrated nodes represent network functions that can be implemented as standalone device(s), or combined with other network functions into a single device or collection of device(s). The telecommunications network 100 includes a terminal 102, which may be or include a cellular phone or other type of terminal such as those described above. Terminal 102 can be configured to originate or receive communications sessions and to perform related functions. Related functions can include, e.g., sending name-lookup requests to nameservers.

In some examples, terminal 102 can communicate via an access network 104, e.g., an LTE or 5G network. In the illustrated example, access network 104 includes a serving gateway 106, e.g., an LTE Serving Gateway (SGW), and a packet gateway 108, e.g., a GGSN, PGW, or UPF. Other examples of packet gateways include a GSM mobile switching center (MSC) server (MSS). Terminal 102 can communicate via serving gateway 106 with the packet gateway 108. For example, serving gateway 106 and packet gateway 108 can establish a packet tunnel 110, e.g., using the GPRS Tunneling Protocol (GTP), the Point-to-Point Protocol (PPP), or another tunneling protocol. IP packets can flow to and from terminal 102 via packet tunnel 110. Packet tunnel 110 can include one or more unidirectional or bidirectional packet flows, e.g., one packet flow in each direction between two endpoints. Packet tunnel 110 can additionally or alternatively include multiple packet flows in a single direction, e.g., bonded to increase bandwidth.

The terminal 102 can be configured to initiate or receive a communication session, such as a voice call, a video call, or another sort of synchronous communication. Initiation of such communications may involve communication clients and Session Initiation Protocol (SIP, RFC 3261) clients communicatively connected with components of the telecommunications network, e.g., an IP Multimedia Subsystem (IMS) core network or other application network providing access-independent services to terminal. Network 100 can include or be connected with any number of access networks 104 or any number of application networks.

Before initiating a session, terminal 102 can request a network address associated with that session. For example, the user of terminal 102 may wish to access a particular Web site. Terminal 102 can send a DNS UDP packet to port 53 of a default nameserver or other specified nameserver. Terminal 102 can determine the nameserver, e.g., by receiving the network address of the nameserver in a DHCP lease or a ProtocolConfigurationOption (PCO) information element (IE). The PCO IE can be provided to terminal 102 as part of the packet data protocol (PDP) context initialization process by which terminal 102 is allocated a network address and gains access to a network via packet gateway 108.

The UDP packet from terminal 102 can be encapsulated by serving gateway 106 and sent across packet tunnel 110. The packet gateway 108 can receive the UDP packet from packet tunnel 110 and determine that it is a DNS request. The packet gateway 108 can then retrieve profile information associated with the terminal 102 (e.g., associated with the PDP context or tunnel endpoint identifier, TEID, of the terminal 102) from a policy server 112. The policy server 112 can be or include, e.g., a Policy and Charging Rules Function (PCRF) of an LTE network, or a 5G Policy Control Function (PCF). Additionally or alternatively, the policy server 112 can include a Home Subscriber Server/Home Location Register (HSS/HLR), Unified Data Management (UDM) server, or other information repository storing profile information.

Based on the profile information from the policy server 112, the packet gateway 108 can forward the UDP packet to nameserver 114 or nameserver 116. In some examples, the packet gateway 108 forwards the UDP packet to exactly one nameserver 114, 116. In the illustrated example, nameserver 116 is shown in phantom. For example, nameserver 114 can be a nameserver controlled by the operator of access network 104. Nameserver 116 can be a publically-accessible Internet nameserver or other nameserver controlled by a party other than the operator of access network 104. A telecommunications network 100 can include any number ≥0 of nameservers 114, and can connect with any number ≥0 of nameservers 116.

In some examples, nameserver 114 and nameserver 116, or any number N>1 of nameservers, can be implemented using at most N−1 physical servers, e.g., using multihomed servers, anycast, dedicated ports, or other network multiplexing techniques. The N nameservers can be apportioned in any way desired among the up to N−1 physical servers. For example, a single server may respond as nameserver 114 to DNS queries on TCP or UDP port 53, and may respond as nameserver 116 to DNS queries on TCP or UDP port 31337.

In some examples, the access network 104 may be any sort of access network, such as a GSM or UMTS network; a universal terrestrial radio network (UTRAN) or an Enhanced Data rates for GSM Evolution (EDGE) radio access network (GERAN); an evolved universal terrestrial radio access network (E-UTRAN); a 3GPP 5G access network; a WIFI (IEEE 802.11) or other LAN access network; or a satellite or terrestrial wide-area access network such as a wireless microwave access (WIMAX) network. In some examples, the access network 104 may include a base station (an eNodeB or gNodeB), as well as an RNC. In some examples, the access network 104 may use any sort of air interface, such as a code division multiple access (CDMA), time division multiple access (TDMA), or frequency division multiple access (FDMA) air interface. In some examples, the access network 104 may provided packet-switched connections or circuit-switched connections. In some examples, the access network 104 may be a packet-switched cellular type of access network or a LAN type of access network. Examples of LAN access networks can include WIFI and IEEE 802.15.1 (BLUETOOTH). In some examples, access network 104 may include any network configured to transport IP packets, e.g., IPv4, IPv6, or any other evolution of an IP-based technology.

In some examples, a non-cellular network can carry voice traffic using Voice-Over-IP (VoIP) or other technologies as well as data traffic, or a cellular network can carry data packets using High Speed Packet Access (HSPA), LTE, or other technologies, as well as voice traffic. Some cellular networks carry both data and voice in a PS format. For example, many LTE networks carry voice traffic in data packets according to the voice-over-LTE (VoLTE) standard.

Telecommunications networks, such as network 100 or a component thereof, may include a core network operated by one or more service providers ("carriers"), such as one or more cellular-telephony providers. The core network is connected via access networks to terminals. Terminals can be operated by users ("subscribers"), or can be autonomous. Example access networks carrying traffic of sessions can include 2G, 3G, or 4G cellular networks; wired data networks such as Ethernet, Asynchronous Transfer Mode (ATM), Public Switched Telephone Network (PSTN), Data Over Cable Service Interface Specification (DOCSIS), digital subscriber line (DSL), or optical networks (e.g., Synchronous Optical NETwork, SONET); or wireless data networks such as IEEE 802.11 WIFI, 802.15.1 BLUETOOTH, or 802.16 WIMAX networks carrying VoIP (e.g., VoWIFI) calls. Some examples can include or be interoperable with LTE or 3GPP fifth-generation New Radio (5G NR) cellular networks carrying VoLTE sessions using SIP signaling. In some examples, the network 100 can provide wide-area wireless coverage using a technology such as GSM or other 2G cellular technologies; UMTS or other 3G cellular technologies; or LTE or other 4G cellular technologies. Example cellular-network technologies can include CDMA, TDMA, Evolution Data Optimized (EVDO), Advanced LTE (LTE+), Generic Access Network (GAN), Unlicensed Mobile Access (UMA), Orthogonal Frequency Division Multiple Access (OFDM), GPRS, EDGE, Advanced Mobile Phone System (AMPS), HSPA, evolved HSPA (HSPA+), GERAN, UTRAN, or evolved UMTS Terrestrial RAN (E-UTRAN).

In some examples, the telecommunications network 100 can include or be communicatively connected with an interworking function (IWF) or other node or device configured to bridge networks, e.g., LTE, 3G, and POTS networks. In some examples, the IWF can bridge Signaling System 7 (SS7) traffic from the PSTN into the telecommunications network 100, e.g., permitting PSTN customers to originate sessions with cellular customers and vice versa.

As used herein, a message "sent to," "transmitted to," or "transmitted toward" a destination, or similar terms, can be sent directly to the destination, or can be sent via one or more intermediate network nodes or devices to the destination. Those intermediate network nodes or devices can include serving gateway 106 or packet gateway 108. Similarly, a message "received from" a destination can be received directly from the destination, or can be received via one or more intermediate network nodes or devices from the destination. A message passing through one or more intermediate network nodes or devices can be modified by those network nodes or devices, e.g., by adding or removing framing, or by changing a presentation of at least part of the message, e.g., from a SIP start-line to a SIP header or vice versa. As used herein, a "reply" message is synonymous with a "response" message. The term "reply" is used for clarity, e.g., when discussing reply messages sent in response to the receipt of messages. The phrase "communicatively connected" includes any type of connection, wired or wireless, for communicating data between devices or processors. These devices or processors can be located in physical proximity or not.

The illustrated nodes, or at least some of them, can be computing nodes in a cluster computing system, e.g., a cloud service or other cluster system ("computing cluster" or "cluster") having several discrete computing nodes that work together to accomplish a computing task assigned to the cluster as a whole. In some examples, at least one illustrated component can be a client of a cluster and can submit jobs to the cluster and/or receive job results from the cluster. Nodes in the cluster can, e.g., share resources, balance load, increase performance, and/or provide fail-over support and/or redundancy. Additionally or alternatively, at least illustrated component can communicate with the cluster, e.g., with a load-balancing or job-coordination device of the cluster, and the cluster or components thereof can route transmissions to individual nodes.

Some cluster-based systems can have all or a portion of the cluster deployed in the cloud. Cloud computing allows for computing resources to be provided as services rather than a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and jobs refers generally to computation, data manipulation, and/or other programmatically-controlled operations. The term "resource" used with reference to clusters, nodes, and jobs refers generally to any commodity and/or service provided by the cluster for use by jobs. Resources can include processor cycles, disk space, random-access memory (RAM) space, network bandwidth (uplink, downlink, or both), prioritized network channels such as those used for communications with quality-of-service (QoS) guarantees, backup tape space and/or mounting/unmounting services, electrical power, etc.

Figure 2:
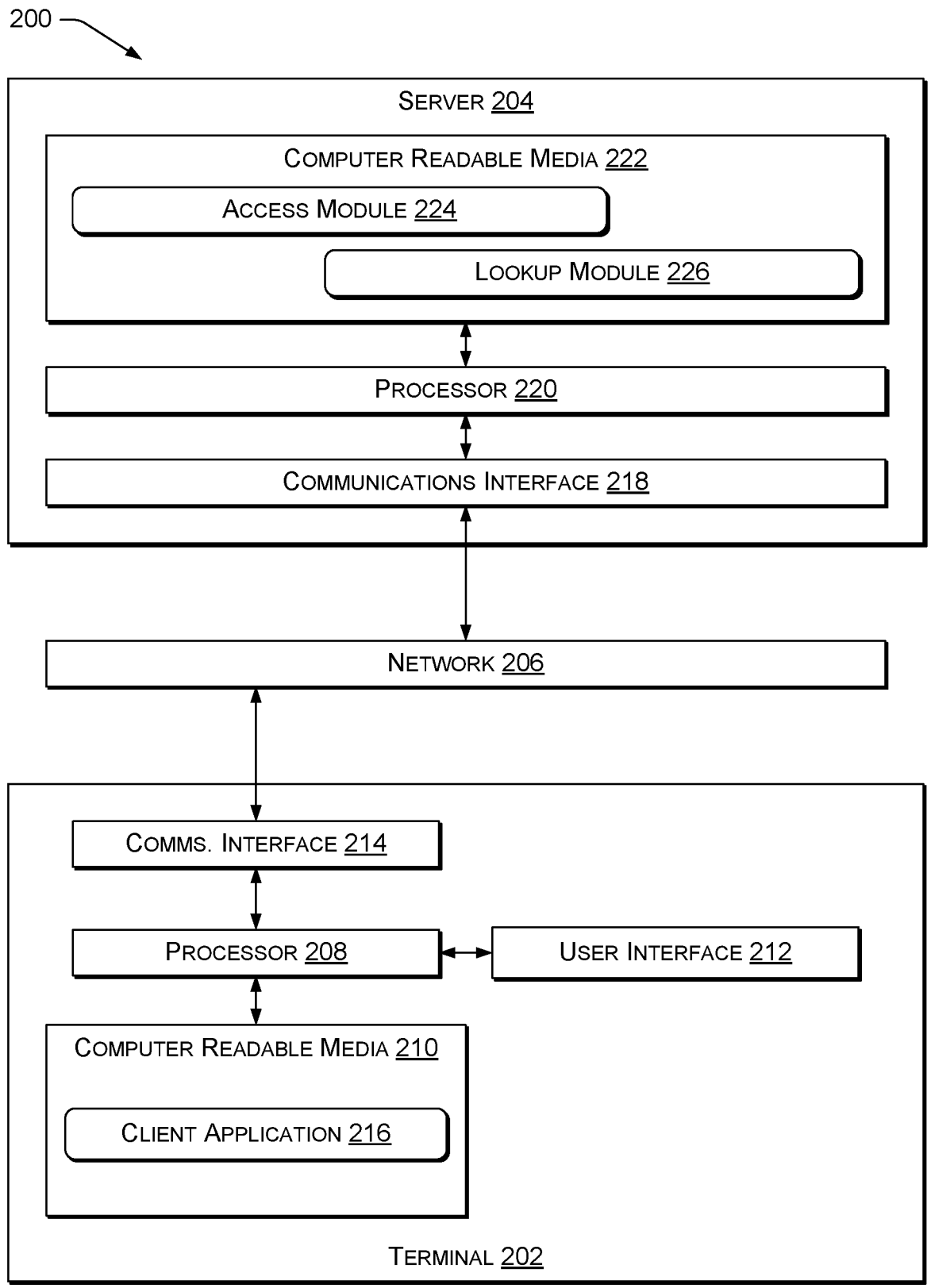
FIG. 2 is a block diagram illustrating components of a system that provides access control or name lookup according to some implementations.

FIG. 2 is a block diagram illustrating a system 200 permitting access control according to some implementations. The system 200 includes a terminal 202 (which can represent terminal 102) communicatively connectable with a server 204 via a network 206. The server 204 can represent a packet gateway 108 or another control system of a telecommunications network configured to perform functions described herein. Server 204 can be implemented using dedicated or shared (e.g., cloud) computing hardware. The network 206, which can incorporate or represent access network 104, can include one or more networks, such as a cellular network, e.g., 5G, or a non-cellular network, e.g., WIFI. Example network technologies are described above with reference to FIG. 1. In some examples, a packet gateway or terminal can include one or more components shown in FIG. 2, and can connect to one or more wired or wireless networks.

The terminal 202 can include one or more processors 208, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs). Terminal 202 can include one or more computer readable media (CRM) 210, such as semi-conductor memory (e.g., RAM, read-only memory (ROM), solid state drives (SSDs), or the like), disk drives (e.g., platter-based hard drives), another class of computer-readable media, or any combination thereof. The terminal 202 can further include a user interface (UI) 212, e.g., including an electronic display device, a speaker, a vibration unit, a touchscreen, or other devices for presenting information to a user and receiving commands from the user. The terminal 202 can further include one or more communications interface(s) 214, e.g., radio(s) or other network interface(s), configured to selectively communicate (wired or wirelessly) via the network 206, e.g., via an access network 104.

CRM 210 can be used to store data and to store instructions that are executable by the processors 208 to perform various functions as described herein. CRM 210 can store various classes of instructions and data, such as an operating system, device drivers, program modules, etc. The processor-executable instructions can be executed by the processors 208 to perform the various functions described herein. CRM 210 can be or include computer-readable storage media. Computer-readable storage media include, but are not limited to, registers, floppy disks, hard disks, SSDs, bar codes, Compact Discs (e.g., CD-ROM), digital versatile disks (DVDs), other optical storage, ROM, erasable programmable read-only memories (EPROM, EEPROM, or Flash), random-access memories (RAMs), other semiconductor memory technology, magnetic cassettes, magnetic tape, magnetic disk storage or other magnetic storage devices, or any other tangible, non-transitory medium which can be used to store the desired information and which can be accessed by the processors 208. In some examples, CRM 210 can include a non-volatile memory in a Subscriber Identity Module (SIM) card.

CRM 210 can include processor-executable instructions of a client application 216. In some examples, terminal 202 can be configured to, e.g., by executing the processor-executable instructions, send name-lookup requests and receive responses; initiate or receive sessions; or transmit data during sessions, e.g., as defined in LTE, 5G, IMS, and IETF specifications. The client application 216, e.g., a native or other dialer, can permit a user to originate and receive communication sessions, e.g., voice or Unstructured Supplementary Service Data (USSD), associated with the terminal 202. The client application 216 can additionally or alternatively include an SMS, RCS, or presence client, or a client of another telephony service offered by the server 204. Additionally or alternatively, the client application 216 can include a Web browser, streaming-media client, or other software to access PDN content via packet gateway 108.

In some examples, server 204 can communicate with (e.g., is communicatively connectable with) terminal 202 or other nodes or devices via network 206 using one or more communications interface(s) 218, e.g., network transceivers for wired or wireless networks, or memory interfaces. Example communications interface(s) 218 can include Ethernet or FIBRE CHANNEL transceivers, WIFI radios, or DDR memory-bus controllers (e.g., for DMA transfers to a network card installed in a physical server 204). Communications interface(s) 214 can include any of the components described in this paragraph.

The server 204 can include one or more processors 220 and one or more CRM 222. CRM 222 can be used to store processor-executable instructions of an access module 224 or a lookup module 226. The access module 224 can direct name-lookup requests, e.g., as discussed herein with reference to FIG. 3-5A, 6, 9, or 10. The lookup module 226 can perform name lookups, e.g., as discussed herein with reference to FIG. 5B, 7, or 8. The processor-executable instructions of access module 224 and lookup module 226 can be executed by the one or more processors 220 to perform various functions described herein. In some examples, server 204 can be configured to, e.g., by executing the processor-executable instructions, perform functions described herein with reference to FIGS. 1 and 3-10.

In some examples, processor 208 and, if required, CRM 210, are referred to for brevity herein as a "control unit." For example, a control unit can include a CPU or DSP and instructions executable by that CPU or DSP to cause that CPU or DSP to perform functions described herein. Additionally or alternatively, a control unit can include an ASIC, FPGA, or other logic device(s) wired (physically or via blown fuses or logic-cell configuration data) to perform functions described herein. Other examples of control units can include processor 220 with, if required, CRM 222.

Illustrative Messages and Operations

Figure 3:
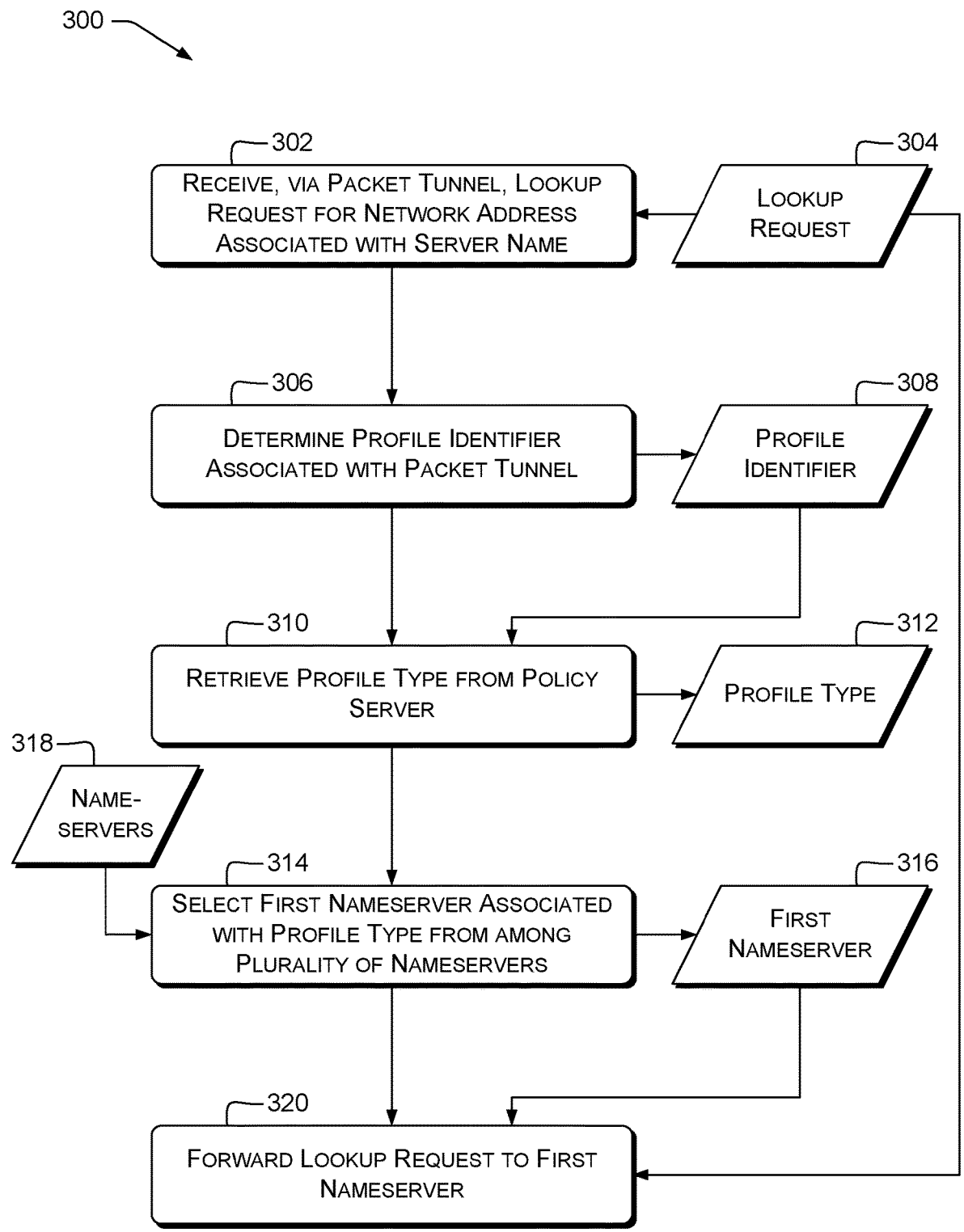
FIG. 3 illustrates an example access-control process performed in a telecommunications network, e.g., at a packet gateway thereof.

FIG. 3 is a dataflow diagram illustrating an example process 300 for controlling access to network services, and related data items. Process 300 can be performed, e.g., by packet gateway 108 or other servers 204 of a telecommunications network 100. Packet gateway 108 can be or include a server 204 or process(es) or module(s) running thereon, or other type(s) of control unit(s) to perform the listed functions. In some examples, server(s) 204 include control unit(s) configured to perform operations described below, e.g., in response to computer program instructions of the access module 224. In some examples, the packet gateway comprises at least one of a GGNS, an LTE PGW, or a 5G UPF.

Operations shown in FIG. 3 and in FIGS. 4-10, discussed below, can be performed in any order except when otherwise specified, or when data from an earlier step is used in a later step. For clarity of explanation, reference is herein made to various components shown in FIGS. 1 and 2 that can carry out or participate in the steps of the exemplary methods, and to various operations and messages that can occur while the exemplary method is carried out or as part of the exemplary method. It should be noted, however, that other components can be used; that is, exemplary method(s) shown in FIGS. 3-10 are not limited to being carried out by the identified components, and are not limited to including the identified operations or messages.

At 302, the control unit can receive, from a terminal via a packet tunnel 110, a lookup request 304. The lookup request 304 can be or include a request for a network address associated with a server name. For example, lookup request 304 can include a DNS request specifying the server name and requesting the corresponding network address, e.g., IPv4 or IPv6 address. In some examples, the packet tunnel 110 comprises a GTP tunnel.

At 306, the control unit can determine a profile identifier 308 associated with the packet tunnel 110. For example, the profile identifier 308 can be an IMSI or IMEI associated with the terminal 102, an MSISDN or other identifier of a subscriber associated with the terminal 102, or another terminal or subscriber ID. For example, the control unit can look up the profile identifier 308 in a database storing active PDP contexts, e.g., using the TEID or terminal network address as the lookup key. The profile identifier 308 can, e.g., uniquely identify a particular subscriber's profile, a particular user's profile, or a special-purpose profile, e.g, created by a parent for a child.

At 310, the control unit can retrieve, from a policy server 112, a profile type 312 associated with the profile identifier 308 (and thereby associated with the corresponding profile, in some examples). In some examples, operation 310 can include retrieving the profile type 312 from the policy server 112 in a Diameter information element (IE). For example, the control unit can send a Diameter or other request including the profile identifier 308 to the policy server 112, and receive a Diameter response indicating the profile type 312. The policy server can include, e.g., at least one of an LTE PCRF or a 5G PCF. In some examples, profile identifier 308, e.g., an IMSI or MSISDN, is carried in a Subscription-ID IE. In some examples, the profile type 312 returned by the policy server 112 is carried in a custom IE, e.g., SN-CF-Policy-ID.

The profile type 312 can represent a general category of account or user for which separate nameservers 114, 116 (or servers 904, 906, FIG. 9) are provided. In some examples, the profile type 312 can indicate a category or level of parental control or restriction applied to uses of terminal 102, e.g., a "restricted" type or an "unrestricted" type, or types for "child," "teen," "unrestricted," or other age-related types. In some examples, the profile type 312 can indicate a category or type of subscription or of network access granted, e.g., "basic" or "unrestricted," or "low-bandwidth" or "high-bandwidth." In some examples, the profile type 312 can indicate a type or capability level of terminal(s) 102 associated with a particular account. For example, an account for which only feature phones are registered may have a profile type 312 of "no video," and an account for which at least one smartphone is registered may have a profile type 312 of "unrestricted."

The discussion throughout this document of profile types (e.g., profile types 312, 510, and 914) is with respect to particular selections, e.g., of nameservers 114, 116 or servers 904, 906. A user, subscriber, account, terminal 102, or packet tunnel 110 can have multiple profile types, each associated with particular types of servers or other network services to be selected. For example, a terminal 102 can be associated with a first profile type used for nameserver selection (e.g., FIGS. 3-6), and with a second, different profile type used for content-server selection (e.g., FIGS. 9 and 10).

At 314, the control unit can select a first nameserver 316 of a plurality 318 of nameservers (e.g., from data indicating the plurality 318 of nameservers, as shown). The first nameserver can be selected as a nameserver associated with the profile type 312. For example, the control unit can look up the profile type 312 in a database listing nameservers of the plurality 318 of nameservers, and select the nameserver indicated by the database as the first nameserver 316. In some examples, operation 314 can include determining data (as shown) indicating the first nameserver 316, e.g., a network address of the first nameserver 316. In some examples, the nameserver comprises a DNS server.

In some examples, the control unit can select the first nameserver 316 based at least in part on at least one of: whether the user has exceeded any subscription settings associated with the profile type 312 (e.g., aggregate traffic); whether the lookup request 304 is being made during an authorized or restricted time period associated with the profile type 312; parental restrictions associated with the profile type 312; time of day; time zone; day of the week; date; or features of the terminal 102, as represented by the profile type 312. For example, for a particular profile type 312, a different first nameserver 316 can be selected at night than during the day.

At 320, the control unit can forward the lookup request 304 to the first nameserver 316. For example, the control unit can send a copy of the lookup request 304 to the first nameserver 316, or can generate and send to the first nameserver 316 a new packet indicating the server name from the lookup request 304. Operation 320, or other packet-forwarding operations described herein, may involve sending a packet unchanged to a different destination than packet gateway 108. Additionally or alternatively, packet-forwarding operations may include changing the packet in some ways, e.g., changing the IPv4/IPv6 destination address, reducing the packet's time-to-live (TTL), increasing the packet's hop count, or adding, removing, or modifying headers or header values stored in the packet (e.g., SIP Via, Route, or Record-Route headers).

Figure 4:
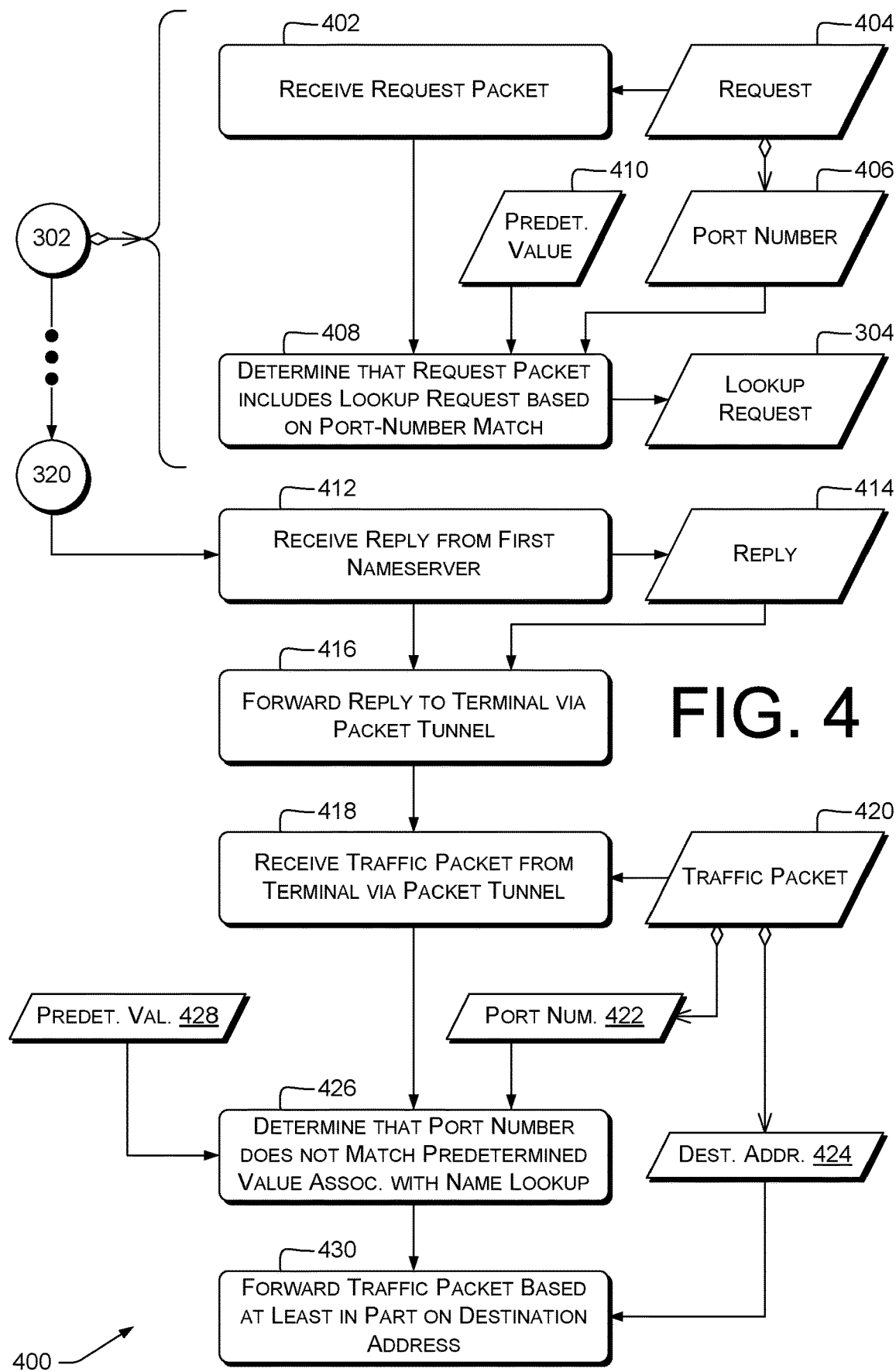
FIG. 4 illustrates example access-control and traffic-handling processes performed in a telecommunications network, e.g., at a packet gateway thereof.

FIG. 4 illustrates example processes 400 performed by server(s) 204 of a packet gateway 108 for controlling access to network resources. In some examples, server(s) 204 include control unit(s) configured to perform operations described below, e.g., in response to computer program instructions of the access module 224. In some examples, operation 302 can include operations 402-408. In some examples, operation 320 can be followed by operations 412-430; operations 412 and 416; or operations 418-430.

At 402, the control unit can receive a request packet 404 comprising a port number 406. Port number 406 can include, e.g., a TCP or UDP port number.

At 408, the control unit can determine that the request packet 404 comprises the lookup request 304 for the network address based on the port number 406 matching a predetermined value 410. For DNS, the predetermined value 410 can be 53.

At 412, the control unit can receive a reply 414 from the first nameserver. For example, reply 414 can include a DNS A or AAAA record carrying a network address associated with the server name indicated in the lookup request 304.

At 416, the control unit can forward the reply 414 to the terminal 102 via the packet tunnel 110. Forwarding can include, e.g., encapsulating the reply (or a packet carrying information extracted from the reply) in GTP User Plane (GTP-U) packet and sending the GTP-U packet via TCP or UDP to serving gateway 106, which can then de-encapsulate the reply (or packet) and send it to terminal 102. Additional examples of forwarding are described herein with reference to operation 320. Operation 416 can be followed by operation 418.

At 418, the control unit can receive a traffic packet 420 from the terminal 102 via the packet tunnel 110. The traffic packet can include a port number 422 and a destination address 424. In some examples, the traffic packet can include encrypted data such as HTTPS traffic or other TLS-encrypted data. In some examples, the traffic packet 420 lacks a cleartext indication of a destination server name. For example, unencrypted HTTP traffic includes such an indication in the HTTP/1.1 Host header. In HTTPS traffic, the Host header is encrypted. In another example, a TLS client hello can carry a cleartext Server Name Indication (SNI) field. In some examples, the traffic packet 420 does not have a cleartext Host header and does not have a cleartext SNI field. In some examples, the traffic packet 420 does not have a cleartext Host or SNI, or any other cleartext indication of the destination server name.

At 426, the control unit can determine that the port number 422 does not match a predetermined value 428 associated with name lookup (e.g., a value of 53 for DNS over TCP or UDP). For example, HTTPS traffic on the standard TCP port of 44353 can be determined not to match the predetermined value 428. Operation 426 can be followed by operation 430. In various examples, predetermined values 410, 428 can be the same or different. In some examples, only one of the predetermined values 410, 428 is used, and references to either predetermined value 410, 428 refer to that one of the predetermined values 410, 428.

At 430, the control unit can forward the traffic packet based at least in part on the destination address. Examples of forwarding are described herein with reference to operations 320 and 416. Operation 430 can be performed in response to the determination at operation 426. Accordingly, in some examples, once the lookup request 304 has been processed, it is no longer necessary to perform server-specific packet inspection to maintain access control. This can reduce the latency in handling traffic packets at packet gateway 108.

Figure 5A:
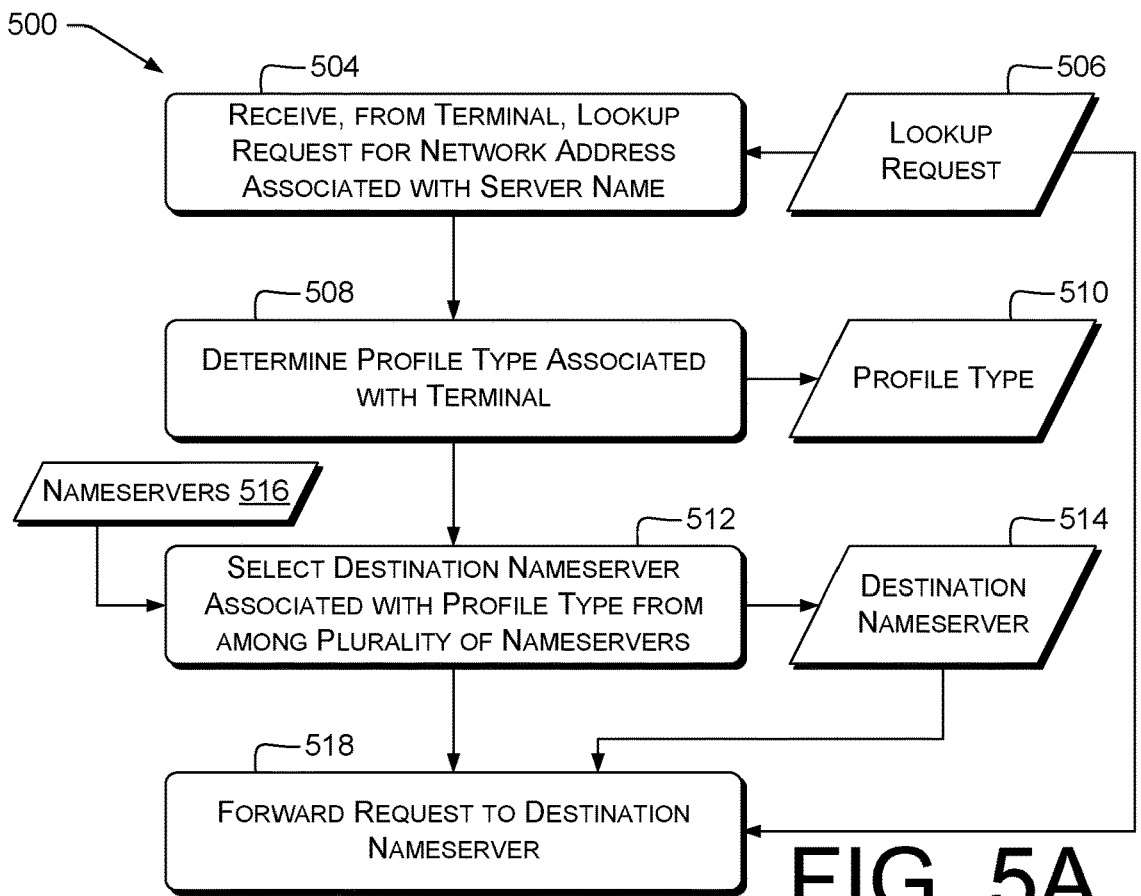
FIG. 5A illustrates an example access-control process performed in a telecommunications network, e.g., at a packet gateway thereof.
Figure 5B:
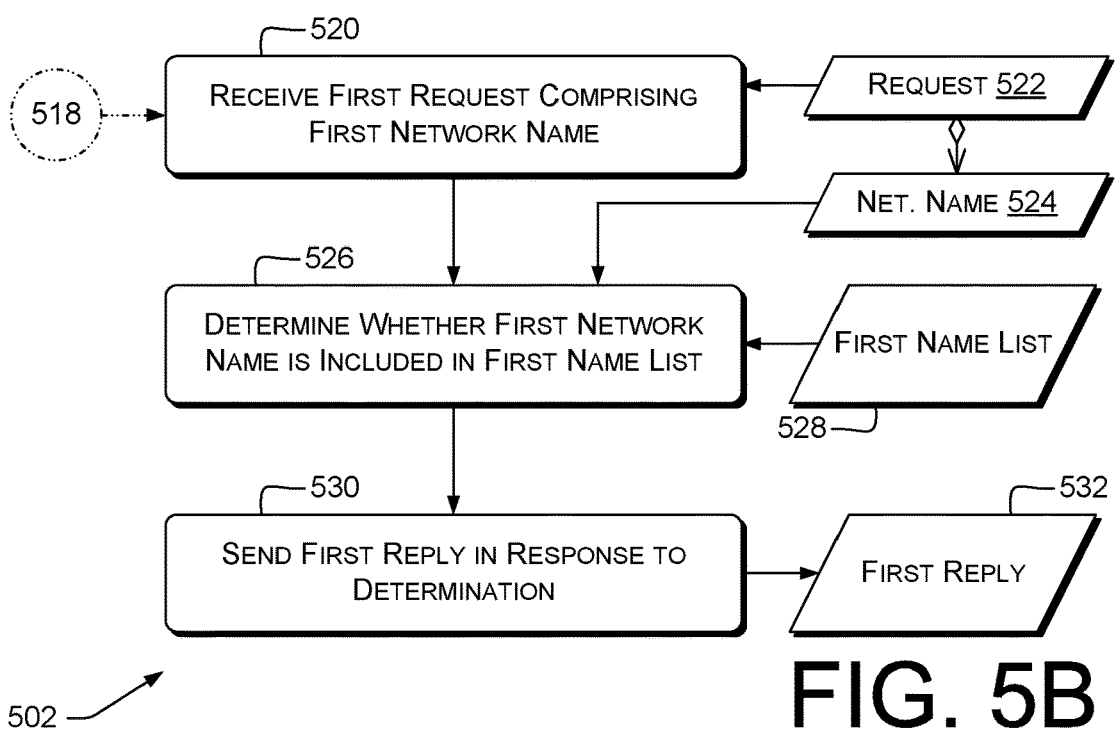
FIG. 5B illustrates an example name-lookup process performed in a telecommunications network, e.g., at a nameserver thereof.

FIGS. 5A and 5B show a dataflow diagram illustrating example processes 500, 502 for managing access to network services, and related data items. Processes 500, 502 can be performed, e.g., by packet gateway 108, nameserver(s) 114, 116, or other server(s) 204 of a telecommunications network 100. In some examples, server(s) 204 include control unit(s) configured to perform operations described below, e.g., in response to computer program instructions of the access module 224 or the lookup module 226.

In some examples, a system such as that shown in FIG. 1 includes a packet gateway 108 and a first nameserver 114 storing a first name list, discussed below. The packet gateway 108 and the first nameserver 114 can be configured to perform operations shown in FIGS. 5A and 5B. In some examples, operations of FIG. 5A are performed by access module 224 of packet gateway 108, and operations of FIG. 5B are performed by lookup module 226 of nameserver(s) 114, 116.

FIG. 5A shows process 500. Functions of process 500 are described for brevity of explanation, without limitation, as being performed at packet gateway 108, e.g., by the access module 224.

At 504, the control unit of the packet gateway 108 can receive, from a terminal 102, a lookup request 506 requesting a network address associated with a server name. Examples are discussed herein, e.g., with reference to operation 302 and lookup request 304.

At 508, the control unit of the packet gateway 108 can determine a profile type 510 associated with the terminal 102. Examples are discussed herein, e.g., with reference to operation 310 and profile type 312. For examples, the packet gateway 108 can look up a tunnel identifier, profile identifier, terminal identifier, or other identifying value in a database, or use any such value to query a policy server 112. The result of the lookup or query can be the profile type 510.

In some examples, the control unit of the packet gateway 108 can retrieve, from policy server 112, the profile type 510 associated with the terminal 102. In some of these examples, the system implementing process 500 can include the policy server 112. In others of these examples, the packet gateway 108 can communicate with a policy server 112, e.g., operated by a different party than is the packet gateway 108. Examples can include roaming situations.

At 512, the control unit of the packet gateway 108 can select a destination nameserver 514 of a plurality 516 of nameservers (or data thereof, as shown). The destination nameserver 514 can be associated with the profile type 510. The plurality 516 of nameservers can include the first nameserver 114. The plurality 516 of nameservers can additionally or alternatively include Internet nameservers, as noted above with reference to nameserver 116. Examples are discussed herein, e.g., with reference to operation 314, first nameserver 316, and plurality 318 of nameservers. In some roaming examples, a home network (HN) of terminal 102 assigns a default nameserver address (e.g., of first nameserver 114 or another nameserver) in the PCO IE. This can be done for outbound roamers served by the Home PGW, in some examples.

At 518, the control unit of the packet gateway 108 can forward the request to the destination nameserver 514. Examples are discussed herein, e.g., with reference to operation 320.

FIG. 5B shows process 502. Functions of process 502 are described for brevity of explanation, without limitation, as being performed at first nameserver 114, e.g., by the lookup module 226. In some examples, operation 518 (shown in phantom) can occur before operation 520.

At 520, the control unit of the first nameserver 114 can receive a first request 522 comprising a first network name 524. Examples are discussed herein, e.g., with reference to operation 320. For example, the first nameserver 114 can receive a DNS request via TCP or UDP.

At 526, the control unit of the first nameserver 114 can determine whether the first network name 524 is included in the first name list 528. The first name list 528 can be a whitelist or a blacklist, in some examples. Examples are discussed herein, e.g., with reference to FIG. 7.

At 530, the control unit of the first nameserver 114 can send a first reply 532 in response to the determination of whether the first network name 524 is included in the first name list 528. Examples are discussed herein, e.g., with reference to operation 412. For example, the control unit can send a DNS, LDAP, or other reply.

Figure 6:
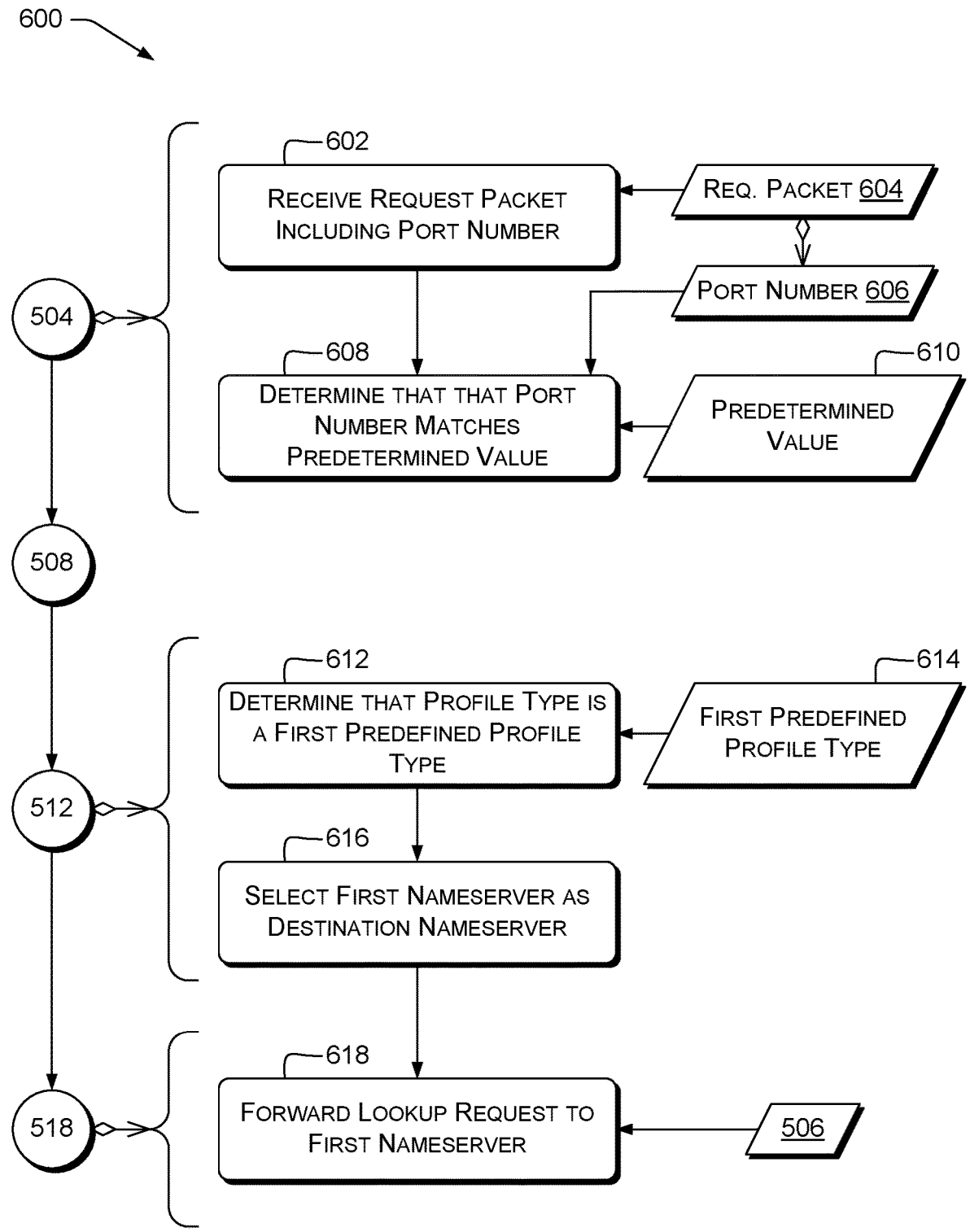
FIG. 6 illustrates example access-control processes performed in a telecommunications network, e.g., at a packet gateway thereof.

FIG. 6 illustrates example processes 600 performed by server(s) 204, e.g., of a packet gateway 108, for controlling access to network resources. In some examples, server(s) 204 include control unit(s) configured to perform operations described below, e.g., in response to computer program instructions of the access module 224. In some examples, operation 504 can include operations 602 and 608. In some examples, operation 512 can include operations 612 and 616. In some examples, operation 518 can include operation 618.

At 602, the control unit of the packet gateway 108 can receive a request packet 604 comprising a port number 606.

At 608, the control unit of the packet gateway 108 can determine that the request packet 604 comprises the lookup request 506 for the network address based on the port number 604 matching a predetermined value 610, e.g., 53 for DNS.

At 612, the control unit of the packet gateway 108 can determine that the profile type 510 is a first predetermined profile type 614. Operation 612 can include comparing profile type 510 and profile type 614, or locating profile type 510 in a set of which predetermined profile type 614 is one member.

At 616, the control unit of the packet gateway 108 can select the first nameserver 114 as the destination nameserver 514. Operation 616 can be performed in response to the determination at operation 612.

At 618, the control unit of the packet gateway 108 can forward the lookup request 506 to the first nameserver 114 (i.e., the destination nameserver 514, in these examples) as the first request 522.

Figure 7:
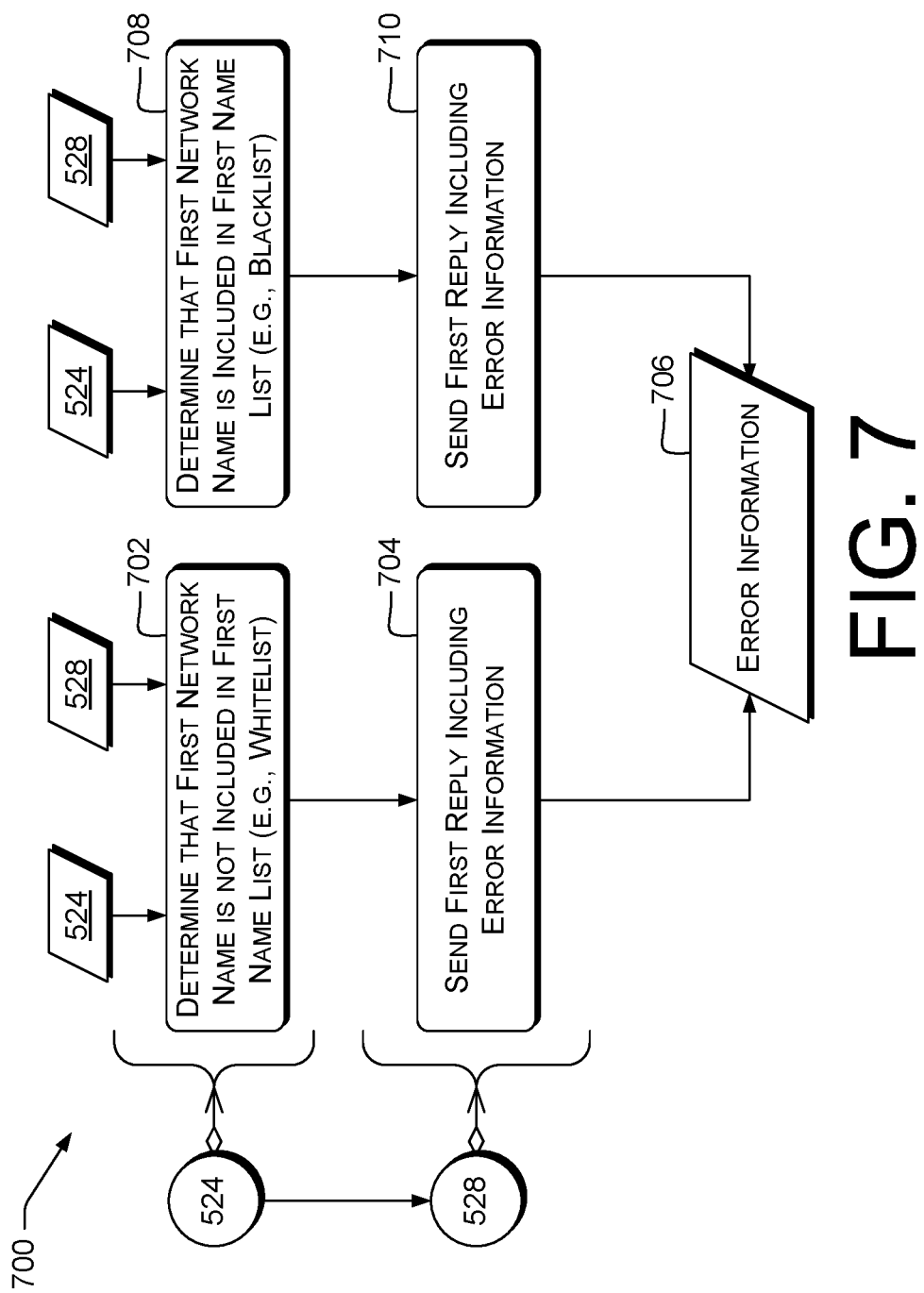
FIG. 7 illustrates example name-lookup processes performed in a telecommunications network, e.g., at a nameserver thereof.

FIG. 7 illustrates example processes 700 performed by server(s) 204, e.g., of a nameserver 114, 116, for controlling access to network resources. In some examples, server(s) 204 include control unit(s) configured to perform operations described below, e.g., in response to computer program instructions of the lookup module 226. In some examples, a telecommunication system includes a first nameserver 114, a second nameserver 116, or both. In some examples, operation 526 can include operation 702 or operation 708. In some examples, operation 530 can include operation 704 or operation 710.

At 702, the control unit can determine that the first network name 524 is not included in the first name list 528, e.g., a whitelist. For example, the control unit can search a relational database, search tree (e.g., balanced search tree or B-tree), BigTable, or other datastore for the first network name 524, and receive a "failure" or "zero records found" result. Additionally or alternatively, the control unit can probe a Bloom filter (or other probabilistic data structure that does not return false negatives) for the first network name 524, and receive a "not stored" response. Operation 702 can be followed by operation 704.

At 704, the control unit can send, in response to the determination at operation 702, the first reply comprising error information 706. For example, the error information 706 can include an error code defined by the name-lookup protocol, a "domain restricted" message or code, or a "no name found" message or code. Additionally or alternatively, the first reply can be a provisional- or success-response message, and the error information 706 can include a network address or name (e.g., a DNS CNAME) of a known server 204 configured to provide user-facing error indications. For example, the known server 204 can be a server that, in response to HTTP(S) connection requests, provides a Web page that has content indicating that the requested domain (e.g., indicated in SNI or the Host header) is not accessible.

At 708, the control unit can determine that the first network name 524 is included in the first name list 528, e.g., a blacklist. For example, the control unit can search a datastore (see operation 702) for the first network name 524 and receive a "success" or "M records found" response, M≥1. Operation 708 can be followed by operation 710.

At 710, the control unit can send, in response to the determination at operation 708, the first reply comprising error information 706. Examples are discussed herein, e.g., with reference to operation 704.

Figure 8:
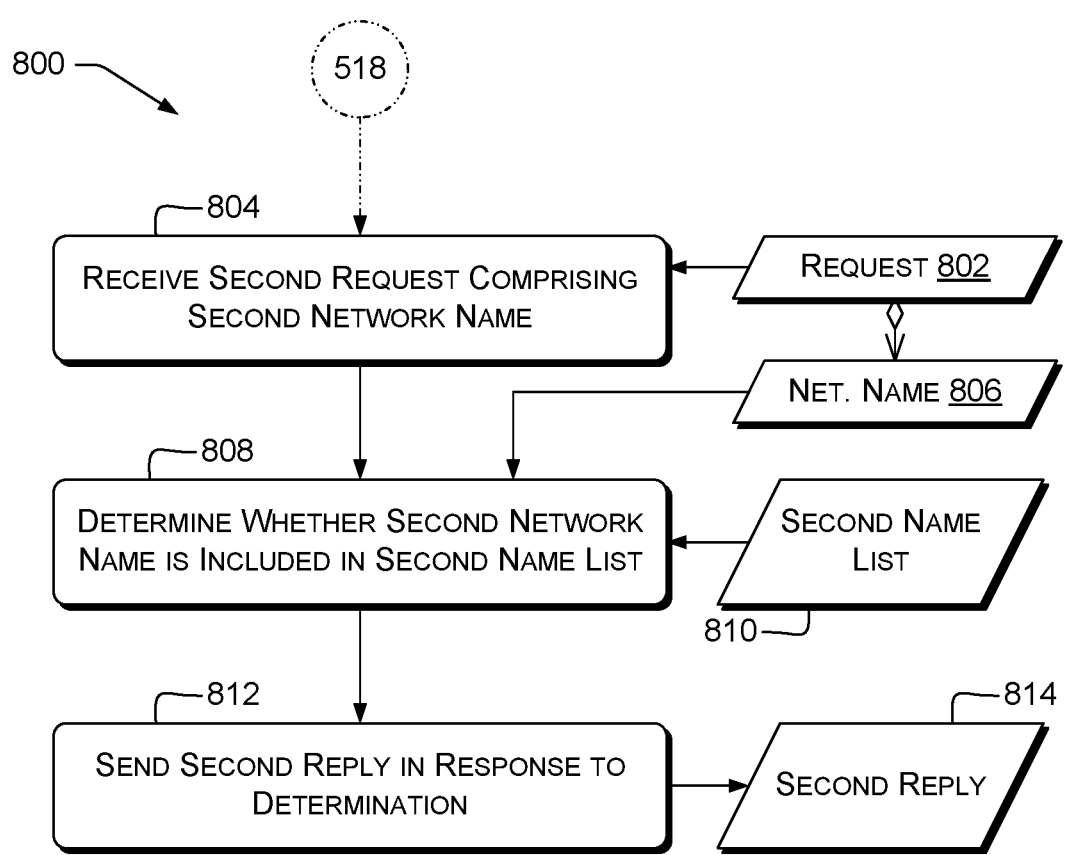
FIG. 8 illustrates example name-lookup processes performed in a telecommunications network, e.g., at a second nameserver thereof.

FIG. 8 illustrates example processes 800 performed by server(s) 204, e.g., of a nameserver 114, 116, for controlling access to network resources. In some examples, server(s) 204 include control unit(s) configured to perform operations described below, e.g., in response to computer program instructions of the lookup module 226. In some examples, a telecommunication system includes at least a first nameserver 114 and a second nameserver 116. In some examples, the second nameserver stores a second name list, e.g., a whitelist or blacklist, as noted below. In some examples, operation 518 forwards a second request 802 to nameserver 116. In these examples, operation 518 is followed by operation 804.

At 804, the control unit can receive the second request 802 comprising a second network name 806. Examples are discussed herein, e.g., with reference to operation 520.

At 808, the control unit can determine whether the second network name 806 is included in the second name list 810. Examples are discussed herein, e.g., with reference to operations 526, 702, or 708.

At 812, the control unit can send, in response, a second reply 814. Operation 812 can be performed in response to the determination at block 808. Examples are discussed herein, e.g., with reference to operation 530.

In some examples, first name list 528 and second name list 810 are the same list. Various of these examples can provide load-balancing between nameservers 114, 116 based on profile type 510. For example, nameservers 114, 116 can be located in different geographic regions, and profile type 510 can indicate the geographic region in which a subscriber is located. This can permit reducing network latency of name lookups, and reducing inter-carrier network traffic volume.

In some examples, first name list 528 and second name list 810 are, or are permitted to be, different lists. The packet gateway 108 routes/forwards each request 506, 522, 802 to the appropriate nameserver 114, 116 based on profile type 510. Accordingly, various of these examples (e.g., systems including packet gateway 108 and nameservers 114 and 116) can provide differentiated access control based on profile type 510 without requiring the nameservers 114, 116 to communicate with policy server 112. This can reduce network traffic to and from the nameservers. Moreover, packet gateway 108 and policy server 112 are often operated by the same carrier, so can take advantage of private or high-bandwidth links within a carrier's network. This can further reduce latency and bandwidth consumption.

Figure 9:
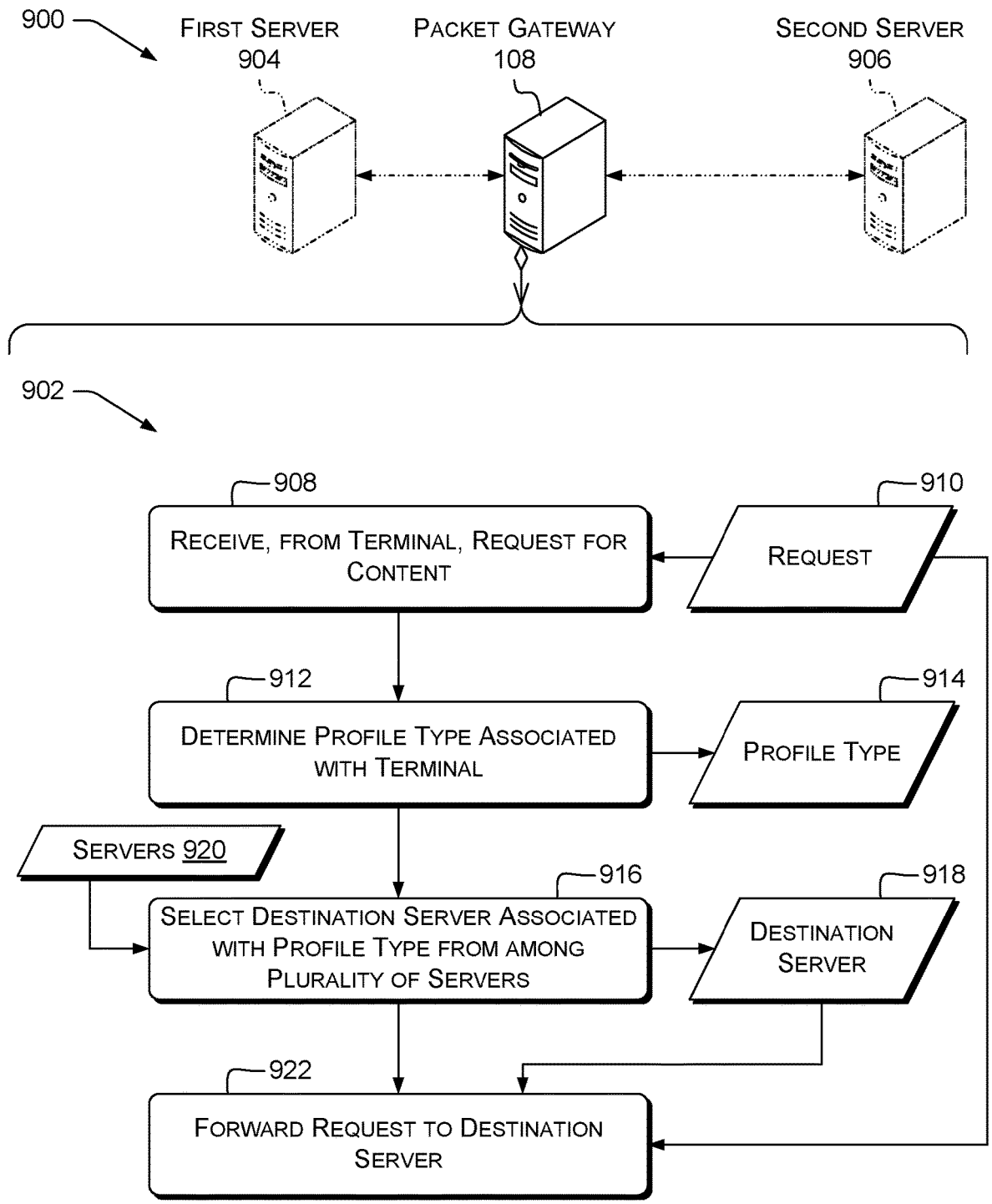
FIG. 9 illustrates an example system and an example access-control method implemented at a packet gateway of the system.

FIG. 9 shows an example system 900 and an example process 902 for managing access to network services, and related data items. Process 902 can be performed, e.g., by packet gateway 108 or other server(s) 204 of a telecommunications network 100. In some examples, server(s) 204 include control unit(s), e.g., of packet gateway 108, that are configured to perform operations described below, e.g., in response to computer program instructions of the access module 224.

In some examples, system 900 includes a packet gateway 108 configured to perform operations shown in FIG. 9. In some examples, system 900 further includes a first server 904 (shown in phantom), e.g., a local cache server. Server 904 can store content, e.g., audio or video to be streamed; data files for bulk transfer; or other types of content. System 900 can additionally or alternatively include other components, e.g., such as those shown in FIG. 1.

In the illustrated example, packet gateway 108 is communicatively connectable with a second server 906 (shown in phantom). In some examples, packet gateway 108 and first server 904 are operated by one party, and second server 906 is operated by a different party. For example, the packet gateway 108 can be communicatively connectable with the second server 906 via a public data network such as the Internet. As discussed above with reference to FIG. 1, servers 904, 906, or other content servers, can be implemented using fewer physical devices than the number of logical servers or network functions. For example, servers 904 and 906 can be implemented on a single physical device. In general, N>1 servers can be implemented on any number 1 . . . N−1 of physical devices.

At 908, the control unit (e.g., of packet gateway 108) can receive, from a terminal 102, a request 910 for content. For example, the request 910 can be an HTTP request or SIP INVITE, or a QUIC Initial packet. The control unit can receive the request 910 via packet tunnel 110.

In some examples, the request 910 is not addressed to the control unit or the device embodying or operated by the control unit (e.g., the packet gateway 108). Operation 908 can include, therefore, inspecting packets received from terminal 102 via packet tunnel 110, and determining that an inspected packet is the request 910 for content.

At 912, the control unit can determine a profile type 914 associated with the terminal 102. Examples are discussed herein, e.g., with reference to operation 508.

At 916, the control unit can select a destination server 918 of a plurality 920 of servers. The plurality 920 of servers includes the first server 904, and can additionally include server(s) operated by the carrier or by other parties. The destination server 918 is associated with the profile type 914. For example, the destination server 918 can be the first server 904 or the second server 906. Examples are discussed herein, e.g., with reference to operations 314, 512, or 616. For example, the control unit can retrieve identification information (e.g., a network address) of the destination server 918 from a database indexed by profile type 914, or by both profile type 914 and the server or other entity to which the request 912 is addressed.

In some examples, operation 912 can include selecting the destination server 918 based at least in part on at least one of the factors listed above with reference to operation 314. Additionally or alternatively, the destination server 918 can be selected based at least in part on a destination of the request 910 (e.g., a destination server name, SNI, or network address associated with or indicated in the request 910), or keyword(s) indicated in the request 910 (e.g., in a header or a body thereof).

At 922, the control unit can forward the request to the destination server 918. Examples of forwarding are discussed herein, e.g., with reference to operations 320, 430, or 518.

Various example of process 902 can provide load-balancing between carrier-operated and external servers based on profile type 914. Various examples of process 902 can provide control of access to network services based on profile type 914. For example, first server 904 can provide a cached copy of desired content, or can provide a subset of the content available from second server 906.

FIG. 10 illustrates example processes 1000 performed by server(s) 204, e.g., of a packet gateway 108, for balancing load or controlling access to network resources. In some examples, server(s) 204 include control unit(s) configured to perform operations described below, e.g., in response to computer program instructions of the access module 224. In some examples, operation 908 can include operation 1002 and operation 912 can include operation 1004. In some examples, operation 912 can include operation 1006. In some examples, operation 916 can include at least one of operations 1008 and 1012.

At 1002, the control unit can receive the request 910 for content via a packet tunnel 110. Examples are discussed herein, e.g., with reference to operation 302. For example, a packet received via packet tunnel 110 can be identified as being or including the request 910 based on, e.g., a port number (such as port 53) or a Protocol/Next Header value of the packet matching a predetermined value.

At 1004, the control unit can determine the profile type as a type associated with the network tunnel, e.g., by database lookup based on TEID or on a network address of terminal 102. Examples are discussed herein, e.g., with reference to operations 306 and 310 or to operation 508.

At 1006, the control unit can retrieve, from a policy server 112, the profile type 914 associated with the terminal 102. Examples are discussed herein, e.g., with reference to operation 310.

At 1008, the control unit can determine that the destination server 918 is the first server 904 in response to the profile type being associated with the first server 904. Some examples of operation 1008 can be used by a packet gateway 108 that is part of a system including, or that is communicatively connectable with, second server 906. In some examples, the first server 904 is closer to the packet gateway 108 with respect to a predetermined distance metric 1010 than is the second server 906. Therefore, even if the second server 906 is able to service the request 910 for content, using the first server 904 to service the request 910 can reduce latency in handling the request 910, or can reduce the volume of inter-carrier or other network traffic. For example, distance metric 1010 can be or include, e.g., hop count, average or peak latency, the inverse of average or peak throughput (bps), packet-loss rates, bit-error rate, or other network performance metrics.

At 1012, the control unit can determine that the destination server 918 is a second server 906 of the plurality 920 of servers in response to the profile type 914 not being associated with the first server 904. For example, second server 906 can be a fallback server used if first server 904 is not available or is not assigned to the profile type 914 associated with terminal 102.

EXAMPLE CLAUSES

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A: A method, comprising, by a packet gateway of a telecommunications network: receiving, from a terminal via a packet tunnel, a lookup request for a network address associated with a server name; determining a profile identifier associated with the packet tunnel; retrieving, from a policy server, a profile type associated with the profile identifier; selecting a first nameserver of a plurality of nameservers, wherein the first nameserver is associated with the profile type; and forwarding the lookup request to the first nameserver.

B: The method according to paragraph A, further comprising: receiving a request packet comprising a port number; and determining that the request packet comprises the lookup request based on the port number matching a predetermined value.

C: The method according to paragraph A or B, further comprising, after forwarding the lookup request, performing the following operations in order: receiving a reply from the first nameserver; forwarding the reply to the terminal via the packet tunnel; receiving a traffic packet from the terminal via the packet tunnel, the traffic packet comprising a destination address and a port number; determining that the port number does not match a predetermined value associated with name lookup; and in response, forwarding the traffic packet based at least in part on the destination address.

D: The method according to paragraph C, wherein the traffic packet comprises encrypted data.

E: The method according to paragraph C or D, wherein the traffic packet lacks a cleartext indication of a destination server name.

F: The method according to any of paragraphs A-E, further comprising retrieving the profile type from the policy server in a Diameter information element (IE).

G: The method according to any of paragraphs A-F, wherein: the packet gateway comprises at least one of a General Packet Radio Service (GPRS) Gateway GPRS Support Node (GGSN), a Long Term Evolution (LTE) Packet Data Network Gateway (PGW), or a fifth-generation User Plane Function (UPF); the packet tunnel comprises a GPRS Tunneling Protocol (GTP) tunnel; the policy server comprises at least one of an LTE Policy and Charging Rules Function (PCRF) or a fifth-generation Policy Control Function (PCF); and the nameserver comprises a Domain Name System (DNS) server.

H: A system comprising: a first nameserver storing a first name list and configured to perform first operations comprising: receiving a first request comprising a first network name; determining whether the first network name is included in the first name list; and in response, sending a first reply; and a packet gateway configured to perform second operations comprising: receiving, from a terminal, a lookup request for a network address associated with a server name; determining a profile type associated with the terminal;

selecting a destination nameserver of a plurality of nameservers, wherein the destination nameserver is associated with the profile type and the plurality of nameservers comprises the first nameserver; and forwarding the lookup request to the destination nameserver.

I: The system according to paragraph H, wherein the second operations comprise: determining that the profile type is a first predetermined profile type; in response, selecting the first nameserver as the destination nameserver; and forwarding the lookup request to the destination nameserver as the first request.

J: The system according to paragraph H or I, wherein the second operations comprise: receiving a request packet comprising a port number; and determining that the request packet comprises the lookup request based on the port number matching a predetermined value.

K: The system according to any of paragraphs H-J, the second operations further comprising retrieving, from a policy server, the profile type associated with the terminal.

L: The system according to paragraph K, further comprising the policy server.

M: The system according to any of paragraphs H-L, wherein the first operations comprise: determining that the first network name is not included in the first name list; and in response, sending the first reply comprising error information.

N: The system according to any of paragraphs H-M, wherein the first operations comprise: determining that the first network name is included in the first name list; and in response, sending the first reply comprising error information.

O: The system according to any of paragraphs H-N, wherein: the plurality of nameservers comprises a second nameserver; and the system further comprises the second nameserver storing a second name list and configured to perform third operations comprising: receiving a second request comprising a second network name; determining whether the second network name is included in the second name list; and in response, sending a second reply.

P: The system according to paragraph O, wherein the third operations comprise: determining that the second network name is not included in the second name list; and in response, sending the second reply comprising error information.

Q: The system according to paragraph O or P, wherein the third operations comprise: determining that the second network name is included in the second name list; and in response, sending the second reply comprising error information.

R: A system comprising: a packet gateway configured to perform first operations comprising: receiving, from a terminal, a request for content; determining a profile type associated with the terminal; selecting a destination server of a plurality of servers, wherein the destination server is associated with the profile type and the plurality of servers comprises a first server; and forwarding the request for content to the destination server.

S: The system according to paragraph R, the first operations further comprising retrieving, from a policy server, the profile type associated with the terminal.

T: The system according to paragraph R or S, the first operations further comprising: receiving the request for content via a packet tunnel; and determining the profile type as a type associated with the packet tunnel.

U: The system according to any of paragraphs R-T, the first operations further comprising selecting the destination server by: determining that the destination server is a first server in response to the profile type being associated with the first server; and determining that the destination server is a second server of the plurality of servers in response to the profile type not being associated with the first server, wherein the packet gateway is communicatively connectable with the second server via a public data network.

V: The system according to paragraph U, wherein the first server is closer to the packet gateway with respect to a predetermined distance metric than is the second server.

W: The system according to paragraph V, further comprising the first server.

X: The system according to any of paragraphs R-W, further comprising the first server.

Y: A computer-readable medium, e.g., a computer storage medium, having thereon computer-executable instructions, the computer-executable instructions upon execution configuring a computer to perform operations as any of paragraphs A-G, H-Q, or R-X recites.

Z: A device comprising: a processor; and a computer-readable medium, e.g., a computer storage medium, having thereon computer-executable instructions, the computer-executable instructions upon execution by the processor configuring the device to perform operations as any of paragraphs A-G, H-Q, or R-X recites.

AA: A system comprising: means for processing; and means for storing having thereon computer-executable instructions, the computer-executable instructions including means to configure the system to carry out a method as any of paragraphs A-G, H-Q, or R-X recites.

AB: A telecommunication system comprising components recited in any of paragraphs A-G, H-Q, or R-X.

AC: A telecommunication device as recited in any of paragraphs A-G, H-Q, or R-X.

CONCLUSION

Many variations and modifications can be made to the above-described examples, the elements of which are to be understood as being among other acceptable examples. All such modifications and variations are intended to be included herein within the scope of this disclosure and protected by the claims. Moreover, this disclosure is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

The methods, processes, or operations described above can be embodied in, and fully automated via, software code modules executed by one or more computers or processors. As used herein, the term "module" is intended to represent example divisions of the described operations (e.g., implemented in software or hardware) for purposes of discussion, and is not intended to represent any type of requirement or required method, manner or organization. Therefore, while various "modules" are discussed herein, their functionality and/or similar functionality can be arranged differently (e.g., combined into a smaller number of modules, broken into a larger number of modules, etc.). In some instances, the functionality and/or modules discussed herein may be implemented as part of a computer operating system (OS). In other instances, the functionality and/or modules may be implemented as part of a device driver, firmware, application, or other software subsystem.

Example computer-implemented operations described herein can additionally or alternatively be embodied in specialized computer hardware, e.g., FPGAs. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

In the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, a recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

What is claimed is:

1. A method, comprising, by a packet gateway of a telecommunications network:
    receiving, from a terminal via a packet tunnel, a lookup request for a network address associated with a server name;
    determining a profile identifier associated with the packet tunnel;
    retrieving, from a policy server, a profile type associated with the profile identifier;
    selecting a first nameserver of a plurality of nameservers, wherein the first nameserver is associated with the profile type; and
    forwarding the lookup request to the first nameserver.

2. The method according to claim 1, further comprising:
    receiving a request packet comprising a port number; and
    determining that the request packet comprises the lookup request based on the port number matching a predetermined value.

3. The method according to claim 1, further comprising, after forwarding the lookup request, performing the following operations in order:
    receiving a reply from the first nameserver;
    forwarding the reply to the terminal via the packet tunnel;
    receiving a traffic packet from the terminal via the packet tunnel, the traffic packet comprising a destination address and a port number;
    determining that the port number does not match a predetermined value associated with name lookup; and
    in response, forwarding the traffic packet based at least in part on the destination address.

4. The method according to claim 3, wherein the traffic packet comprises encrypted data.

5. The method according to claim 3, wherein the traffic packet lacks a cleartext indication of a destination server name.

6. The method according to claim 1, further comprising retrieving the profile type from the policy server in a Diameter information element (IE).

7. The method according to claim 1, wherein:
    the packet gateway comprises at least one of a General Packet Radio Service (GPRS) Gateway GPRS Support Node (GGSN), a Long Term Evolution (LTE) Packet Data Network Gateway (PGW), or a fifth-generation User Plane Function (UPF);
    the packet tunnel comprises a GPRS Tunneling Protocol (GTP) tunnel;
    the policy server comprises at least one of an LTE Policy and Charging Rules Function (PCRF) or a fifth-generation Policy Control Function (PCF); and
    the nameserver comprises a Domain Name System (DNS) server.

8. A system comprising:
    a first nameserver storing a first name list and configured to perform first operations comprising:
        receiving a first request comprising a first network name;
        determining whether the first network name is included in the first name list; and
        in response, sending a first reply; and
    a packet gateway configured to perform second operations comprising:
        receiving, from a terminal, a lookup request for a network address associated with a server name;

determining a profile type associated with the terminal;
selecting a destination nameserver of a plurality of nameservers, wherein the destination nameserver is associated with the profile type and the plurality of nameservers comprises the first nameserver; and
forwarding the lookup request to the destination nameserver.

9. The system according to claim 8, wherein the second operations comprise:
determining that the profile type is a first predetermined profile type;
in response, selecting the first nameserver as the destination nameserver; and
forwarding the lookup request to the destination nameserver as the first request.

10. The system according to claim 8, wherein the second operations comprise:
receiving a request packet comprising a port number; and
determining that the request packet comprises the lookup request based on the port number matching a predetermined value.

11. The system according to claim 8, the second operations further comprising retrieving, from a policy server, the profile type associated with the terminal.

12. The system according to claim 11, further comprising the policy server.

13. The system according to claim 8, wherein the first operations comprise:
determining that the first network name is not included in the first name list; and
in response, sending the first reply comprising error information.

14. The system according to claim 8, wherein the first operations comprise:
determining that the first network name is included in the first name list; and
in response, sending the first reply comprising error information.

15. The system according to claim 8, wherein:
the plurality of nameservers comprises a second nameserver; and
the system further comprises the second nameserver storing a second name list and configured to perform third operations comprising:
receiving a second request comprising a second network name;
determining whether the second network name is included in the second name list; and
in response, sending a second reply.

16. A system comprising:
a packet gateway configured to perform first operations comprising:
receiving, from a terminal, a request for content;
determining a profile type associated with the terminal;
selecting a destination server of a plurality of servers, wherein the destination server is associated with the profile type and the plurality of servers comprises a first server; and
forwarding the request for content to the destination server.

17. The system according to claim 16, the first operations further comprising retrieving, from a policy server, the profile type associated with the terminal.

18. The system according to claim 16, the first operations further comprising:
receiving the request for content via a packet tunnel; and
determining the profile type as a type associated with the packet tunnel.

19. The system according to claim 16, the first operations further comprising selecting the destination server by:
determining that the destination server is a first server in response to the profile type being associated with the first server; and
determining that the destination server is a second server of the plurality of servers in response to the profile type not being associated with the first server, wherein the packet gateway is communicatively connectable with the second server via a public data network.

20. The system according to claim 19, wherein the first server is closer to the packet gateway with respect to a predetermined distance metric than is the second server.

* * * * *